July 25, 1950
M. COLAROSSI
2,516,185
DOOR HOOK
Filed June 10, 1947
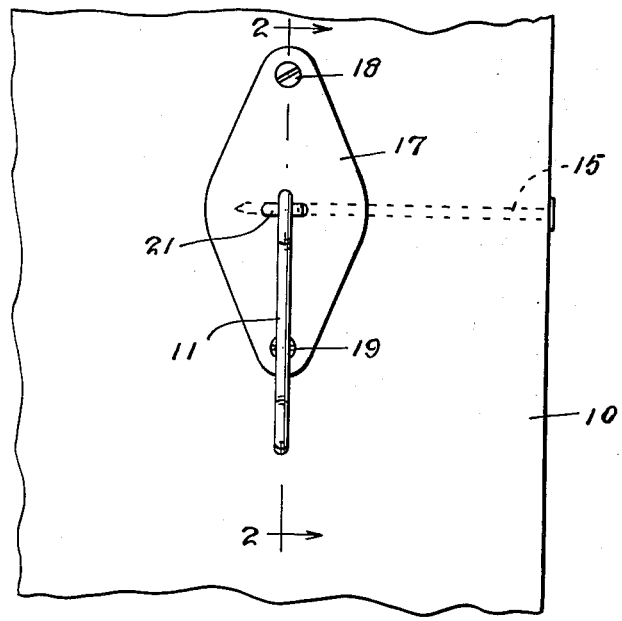
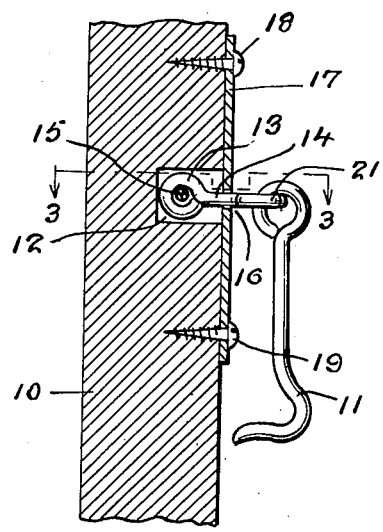
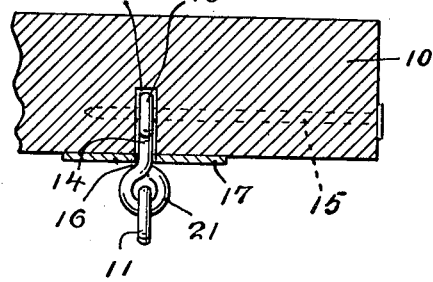
INVENTOR.
MALVINA COLAROSSI
BY Victor J. Evans & Co.
ATTORNEYS Patented July 25, 1950

2,516,185

UNITED STATES PATENT OFFICE 2,516,185

DOOR HOOK

Malvina Colarossi, Los Angeles, Calif.

Application June 10, 1947, Serial No. 753,770

2 Claims. (Cl. 292—95)

This invention relates to door hooks or clasps.

It is an object of the present invention to provide a door hook or clasp which when fastened to the door cannot easily be detached therefrom and wherein the attachment on the hook can be effected quickly by the mere driving of a nail from the edge of the door inwardly and through an eye portion of an attaching member and further wherein the eye portion will be confined within a slot in the side of the door and in rear of a protecting plate through which it is outwardly extended to retain the hook itself.

Other objects of the present invention are to provide a door hook or clasp which is not readily detachable from the door which is of simple construction, inexpensive to manufacture and convenient to install and use.

For other objects and for a better understanding of the invention, reference may be had to the following detailed description taken in connection with the accompanying drawing, in which Fig. 1 is a front elevational view of a portion of a door and of the door hook installed thereon.

Fig. 2 is a cross-sectional view taken on line 2—2 of Fig. 1.

Fig. 3 is a transverse cross-sectional view taken on line 3—3 of Fig 2.

Referring now to the figures, 10 represents a door having a side face on which a hook or clasp 11 is to be disposed. To install the hook there is provided in the side face of the door a slot 12 into which is extended an eye portion 13 of an attaching member 14. With the eye portion 13 in place, a nail 15 is driven from the edge of the door through the slot 12 and through the eye portion 13. Thus the attaching member 14 is made secure within the slot 12 and within the door body. The attaching member 14 extends through a hole 16 in a cover plate 17 which is connected to the face of the door by fastening screws 18 and 19. The hook 11 is fastened to an eye portion 21 on the attaching member 14. The hook will be attached as the door is closed to an eye on the door framework in the usual manner whereby to retain the door in the closed position.

It should be apparent that the attaching member 14 is made doubly secure upon the door by the nail 15 and by the plate 17. Both the nail and the plate 17 would have to be detached to remove the member 14. A hook attached in this manner cannot be readily detached from a door as in the case where an ordinary screw eye is used. The hook 11 will accordingly stay put.

While various changes may be made in the detail construction, it shall be understood that such changes shall be within the spirit and scope of the present invention as defined by the appended claims.

I claim:

1. A stay put hook for a door and the like comprising an attaching member having an eye portion adapted to be extended into an opening in the door a pin extended through the opening in the door and positioned in the eye of the attaching member, whereby the attaching member will be retained within the opening and against displacement therefrom, and a hook member connected to the attaching member for pivotal movement and by which the said attaching member and door may be hooked to a door frame, and a plate having a central opening therethrough, said attaching member being extended through the opening of the plate and said plate adapted to be attached to the front face of the door or the like.

2. A door hook mounting comprising an attaching member having eyes at the ends, a hook having a shank with an eye at the end thereof by means of which the hook is attached to an eye at one end of the attaching member, a face plate positioned on said attaching member, and a nail for securing the said attaching member in an opening in a door or the like with the nail positioned in the eye in the end of the attaching member opposite to that in which the hook is attached.

MALVINA COLAROSSI.

REFERENCES CITED

The following references are of record in the file of this patent:

UNITED STATES PATENTS

| Number | Name | Date |
| --- | --- | --- |
| 918,791 | Standeford | Apr. 20, 1909 |
| 1,388,970 | Randazzo | Aug. 30, 1921 |

OTHER REFERENCES

Popular Mechanics, page 440, September 1937.